US012596056B2

(12) United States Patent
Kwong

(10) Patent No.: US 12,596,056 B2
(45) Date of Patent: Apr. 7, 2026

(54) INTEGRATED LEAK DETECTION DEVICE FOR ENGINE CYLINDER

(71) Applicant: Evan Kwong, Monterey Park, CA (US)

(72) Inventor: Evan Kwong, Monterey Park, CA (US)

( * ) Notice: Subject to any disclaimer, the term of this patent is extended or adjusted under 35 U.S.C. 154(b) by 0 days.

(21) Appl. No.: 18/885,980

(22) Filed: Sep. 16, 2024

(65) Prior Publication Data

US 2026/0079079 A1 Mar. 19, 2026

(51) Int. Cl.
G01M 15/08 (2006.01)

(52) U.S. Cl.
CPC .................................. G01M 15/08 (2013.01)

(58) Field of Classification Search
CPC .................................................... G01M 15/08
See application file for complete search history.

(56) References Cited

U.S. PATENT DOCUMENTS 2,625,033 A * 1/1953 Adair ...................... G01M 3/26
73/114.19

2007/0256478 A1* 11/2007 Guadagnola ........ G01M 3/3254
73/40

* cited by examiner

*Primary Examiner* — Timothy P Graves

(57) ABSTRACT

Provided is an integrated leak detection device for an engine cylinder, the integrated leak detection device comprising: a body, having a gas inlet, a first chamber, a connecting channel, a second chamber, and a gas outlet; a shutoff structure movably disposed on the connecting channel and having a blocking state in which the communication between the first chamber and the second chamber is shut off and a communicating state in which the first chamber is in communication with the second chamber; a first pressure sensor disposed on the body and located in the first chamber; a second pressure sensor disposed on the body and located in the second chamber, the second pressure sensor being configured to detect a pressure of the second chamber, to detect a gas pressure of the engine cylinder, and to detect a piston top-dead-center position of the engine cylinder; and a controller disposed on the body and configured to execute a predetermined program based on feedback information of the first pressure sensor and the second pressure sensor to obtain leakage information, gas pressure information, and piston top-dead-center position information. The integrated leak detection device serves three purposes, and has a small overall size and low costs.

18 Claims, 7 Drawing Sheets

INTEGRATED LEAK DETECTION DEVICE FOR ENGINE CYLINDER

TECHNICAL FIELD

The present disclosure relates to the technical field of detecting engine cylinders, and in particular to an integrated leak detection device for an engine cylinder.

BACKGROUND ART

At present, in the process of detecting an engine cylinder, the engine cylinder needs to be subjected to leakage detection, high-pressure detection and piston top-dead-center position detection by using three special-purpose instruments respectively. Different special-purpose instruments need to be changed during detection, resulting in complex operation and low detection efficiency; and the three special-purpose instruments having independent functions occupy a large space, are not convenient to store, and have high costs.

SUMMARY

Embodiments of the present disclosure provide an integrated leak detection device for an engine cylinder, for solving the problems in the related art. The technical solution is described as follows.

An embodiment of the present disclosure provides an integrated leak detection device for an engine cylinder, the integrated leak detection device comprising:

a body, having a gas inlet, a first chamber, a connecting channel, a second chamber, and a gas outlet, the gas inlet being configured to be in communication with a gas supply device, the first chamber being in communication with the gas inlet, the connecting channel being located between the first chamber and the second chamber and in communication with the first chamber and the second chamber, and the gas outlet being configured to be in communication with the engine cylinder;

a shutoff structure movably disposed on the connecting channel, the shutoff structure having a blocking state in which the communication between the first chamber and the second chamber is shut off and a communicating state in which the first chamber is in communication with the second chamber, and the shutoff structure being moved to switch between the blocking state and the communicating state;

a first pressure sensor disposed on the body and located in the first chamber, the first pressure sensor being configured to detect a pressure of the first chamber;

a second pressure sensor disposed on the body and located in the second chamber, the second pressure sensor being configured to detect a pressure of the second chamber, to detect a gas pressure of the engine cylinder, and to detect a piston top-dead-center position of the engine cylinder; and a controller disposed on the body and electrically connected to the first pressure sensor and the second pressure sensor, the controller being configured to execute a predetermined program based on feedback information of the first pressure sensor and the second pressure sensor to obtain leakage information, gas pressure information, and piston top-dead-center position information.

The above description is merely presented for the purpose of the specification, and is not intended to limit the present disclosure in any way. In addition to the above illustrative aspects, implementations and features, further aspects, implementations and features of the present disclosure will become readily apparent with reference to the accompanying drawings and the following detailed description.

BRIEF DESCRIPTION OF THE DRAWINGS

In figures, the same reference signs denote the same or similar components or elements throughout multiple figures unless otherwise specified. These figures are not necessarily drawn to scale. It should be understood that these figures depict only some implementations disclosed according to the present disclosure and are not to be construed as limiting the scope of the present disclosure.

LIST OF REFERENCE SIGNS

Figure 1:
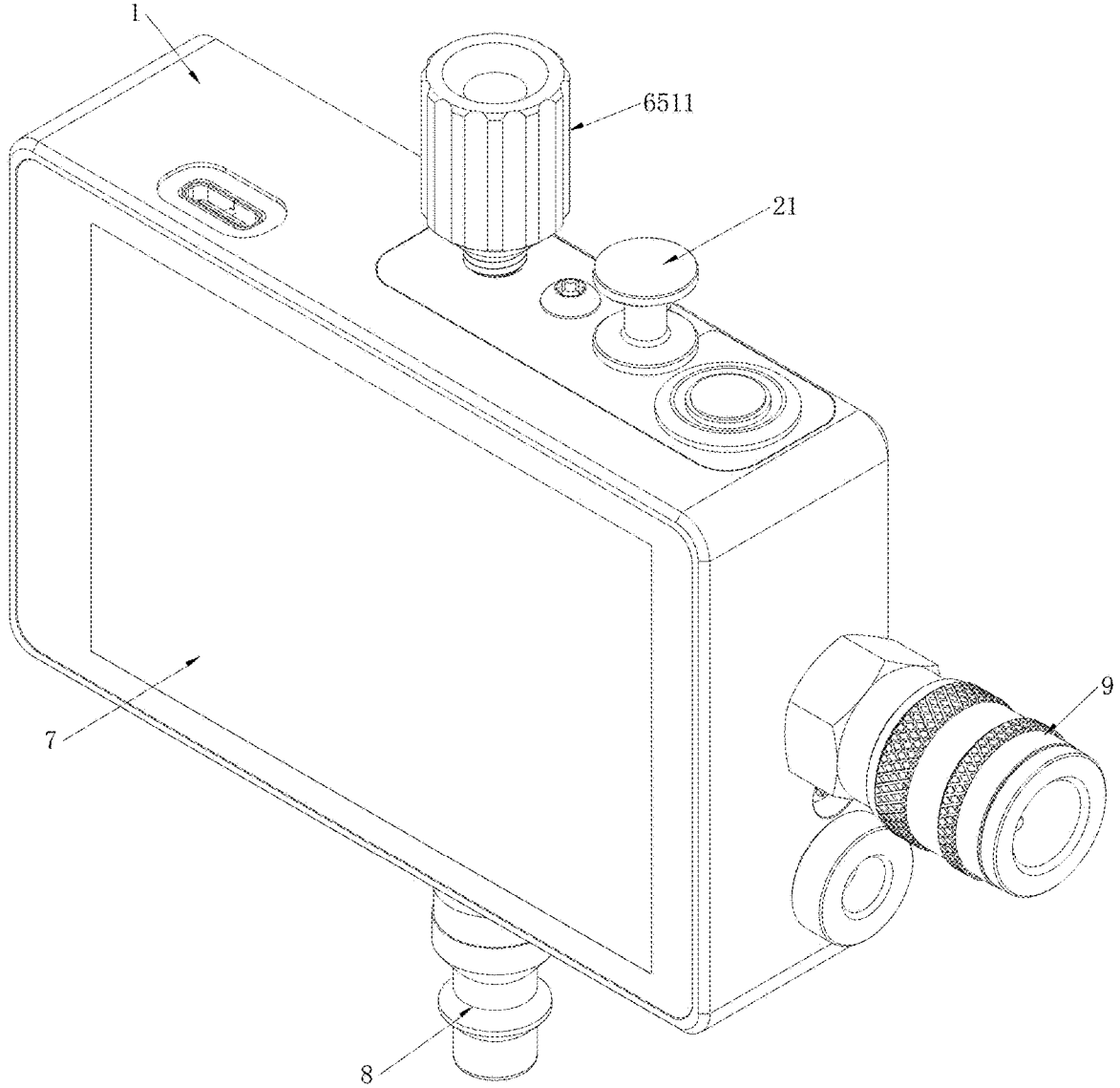
FIG. 1 is a schematic perspective structural diagram of an integrated leak detection device of the present disclosure from a first perspective.
Figure 2:
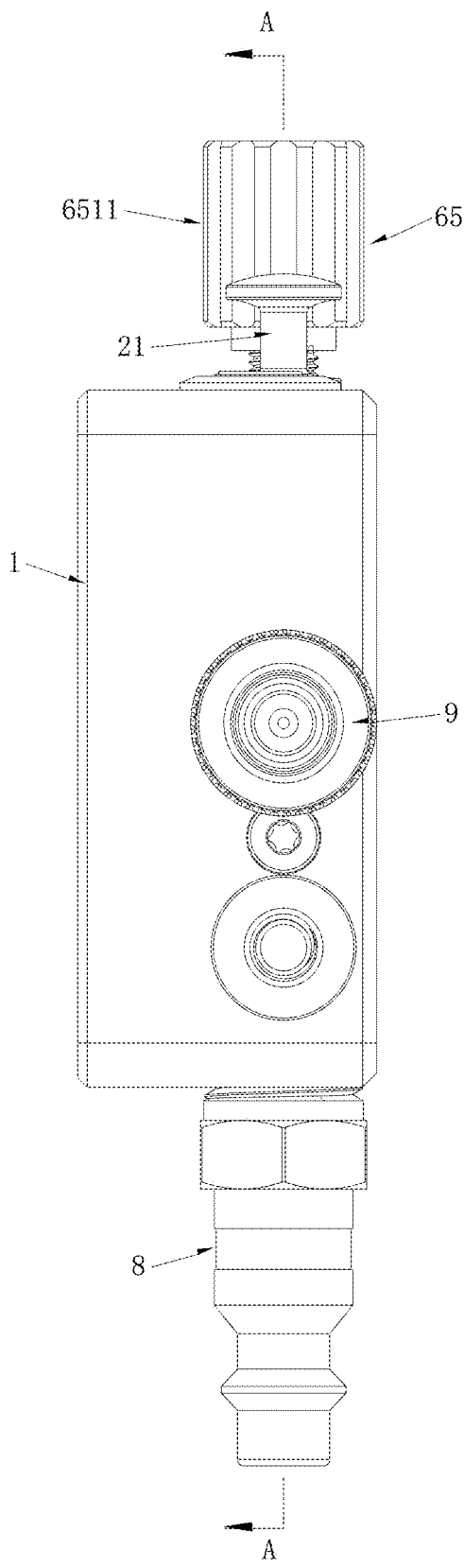
FIG. 2 is a schematic perspective structural diagram of the integrated leak detection device of the present disclosure from a second perspective.

1. Body; 11. Gas inlet; 12. First chamber; 13. Connecting channel; 14. Second chamber; 15. Gas outlet; 16. Vent hole; 17. Gas release runner; 2. Shutoff structure; 21. First blocking portion; 22. First operating portion; 23. Fifth seal ring; 24. Sixth seal ring; 3. First pressure sensor; 4. Second pressure sensor; 5. Controller; 6. Pressure regulating mechanism; 61. Valve seat; 611. Gas intake runner; 612. First gas discharge runner; 613. Second gas discharge runner; 614. Second limiting groove; 615. Second ring-shaped positioning groove; 62. Gas intake plunger; 621. Second blocking portion; 622. First ring-shaped positioning groove; 623. First limiting portion; 624. Second limiting portion; 63. Gas release plunger; 631. Gas release hole; 632. First limiting groove; 633. Third ring-shaped positioning groove; 64. First elastic member; 65. Adjusting member; 651. Knob; 6511. Second operating portion; 652. Floating member; 6521. First connecting portion; 6522. Second connecting portion; 66. First seal ring; 67. Second seal ring; 68. Second elastic member; 69. Third seal ring; 610. Fourth seal ring; 7. Display; 8. First quick connector; 9. Second quick connector.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present disclosure. Therefore, the accompanying drawings and the description are considered as exemplary in nature rather than limiting.

Referring to FIGS. 1-7, an integrated leak detection device for an engine cylinder according to a preferred implementation of the present invention is illustrated. The integrated leak detection device comprises: a body 1, a shutoff structure 2, a first pressure sensor 3, a second pressure sensor 4, and a controller 5.

The body 1 has a gas inlet 11, a first chamber 12, a connecting channel 13, a second chamber 14, and a gas outlet 15, the gas inlet 11 is configured to be in communication with a gas supply device, the first chamber 12 is in communication with the gas inlet 11, the connecting channel 13 is located between the first chamber 12 and the second chamber 14 and in communication with the first chamber 12 and the second chamber 14, and the gas outlet 15 is configured to be in communication with the engine cylinder.

The shutoff structure 2 is movably disposed on the connecting channel 13, the shutoff structure 2 has a blocking state in which the communication between the first chamber 12 and the second chamber 14 is shut off and a communicating state in which the first chamber 12 is in communication with the second chamber 14, and the shutoff structure 2 is moved to switch between the blocking state and the communicating state.

The first pressure sensor 3 is disposed on the body 1 and located in the first chamber 12, and the first pressure sensor 3 is configured to detect a pressure of the first chamber 12.

The second pressure sensor 4 is disposed on the body 1 and located in the second chamber 14, the second pressure sensor 4 is configured to detect a pressure of the second chamber 14, to detect a gas pressure of the engine cylinder, and to detect a piston top-dead-center position of the engine cylinder.

The controller 5 is disposed on the body 1. The controller 5 is electrically connected to the first pressure sensor 3 and the second pressure sensor 4, and the controller 5 is configured to execute a predetermined program based on feedback information of the first pressure sensor 3 and the second pressure sensor 4 to obtain leakage information, gas pressure information, and piston top-dead-center position information.

According to the integrated leak detection device of the present invention, functions of engine cylinder leakage detection, engine high-pressure detection, and engine cylinder piston top-dead-center position detection are integrated through joint arrangement of the body 1, the shutoff structure 2, the first pressure sensor 3, the second pressure sensor 4 and the controller 5, making the functions more diversified and realizing the triple-use of a single machine. During detection, there is no need to disassemble and replace different special-purpose instruments for many times, simplifying the operation and achieving a higher detection efficiency. Moreover, the device has a small overall size, occupies a small space, and is convenient to carry and store. In addition, since it is only necessary to integrate the shutoff structure 2, the first pressure sensor 3, the second pressure sensor 4 and the controller 5 on the same body 1, compared with the solution of using three different special-purpose instruments in the prior art to perform the leakage detection, the high-pressure detection and the piston top-dead-center position detection on the engine cylinder respectively, the integrated leak detection device has fewer parts, and the cost can thus be reduced, facilitating the popularization and application of this integrated leak detection device.

The integrated leak detection device of the present invention is used as follows.

Engine Cylinder Leakage Detection:

The shutoff structure 2 is moved such that the shutoff structure 2 is in the communicating state, that is, the connecting channel 13 is in communication with the first chamber 12 and the second chamber 14.

The gas inlet 11 is in communication with the external gas supply device and the gas outlet 15 is in communication with the engine cylinder.

The gas supply device is activated to allow a high-pressure gas source to pass through the gas inlet 11, the first chamber 12, the connecting channel 13, and the second chamber 14 in sequence, and finally enters the interior of the engine cylinder. In this process, the first chamber 12 and the second chamber 14 are both filled with the high-pressure gas source, the first pressure sensor 3 detects the pressure of the first chamber 12 in real time and feeds the pressure back to the controller 5, the second pressure sensor 4 detects the pressure of the second chamber 14 in real time and feeds the pressure back to the controller 5, to ensure the balance between the gas pressure in the first chamber 12 and the gas pressure of the second chamber 14 and maintain the balance for a set time. After the set time is over, the controller 5 compares the feedback information of the first pressure sensor 3 with the feedback information of the second pressure sensor 4 to calculate a leakage percentage and feeds the leakage percentage back to the display 7. If the leakage percentage exceeds a set value such as 30%-40%, it will be fed back to a user to consider repair.

Engine Cylinder High-Pressure Detection:

The shutoff structure 2 is moved such that the shutoff structure 2 is in the blocking state to shut off the communication between the first chamber 12 and the second chamber 14.

The gas outlet 15 is in communication with the engine cylinder, the pressure of the engine cylinder is detected using the second pressure sensor 4 and fed back to the controller 5, and the controller 5 determines whether the engine cylinder is in a high-pressure state according to the feedback information of the second pressure sensor 4 and fed a high-pressure state result back to the display 7.

Engine Cylinder Piston Top-Dead-Center Position Detection:

The shutoff structure 2 is moved such that the shutoff structure 2 is in the blocking state to shut off the communication between the first chamber 12 and the second chamber 14.

The gas outlet 15 is in communication with the engine cylinder, and an engine crankshaft is rotated. In this process, the gas pressure of the engine cylinder is detected using the second pressure sensor 4 and fed back to the controller 5, and the controller 5 determines the piston top-dead-center position of the engine cylinder based on the feedback information of the second pressure sensor 4 and feeds a result of the piston top-dead-center position of the engine cylinder back to the display 7. In this process, when the second pressure sensor 4 reads a positive and negative pressure balance point of the engine cylinder, it is determined that the piston of the engine cylinder is at the top-dead-center position.

Figure 3:
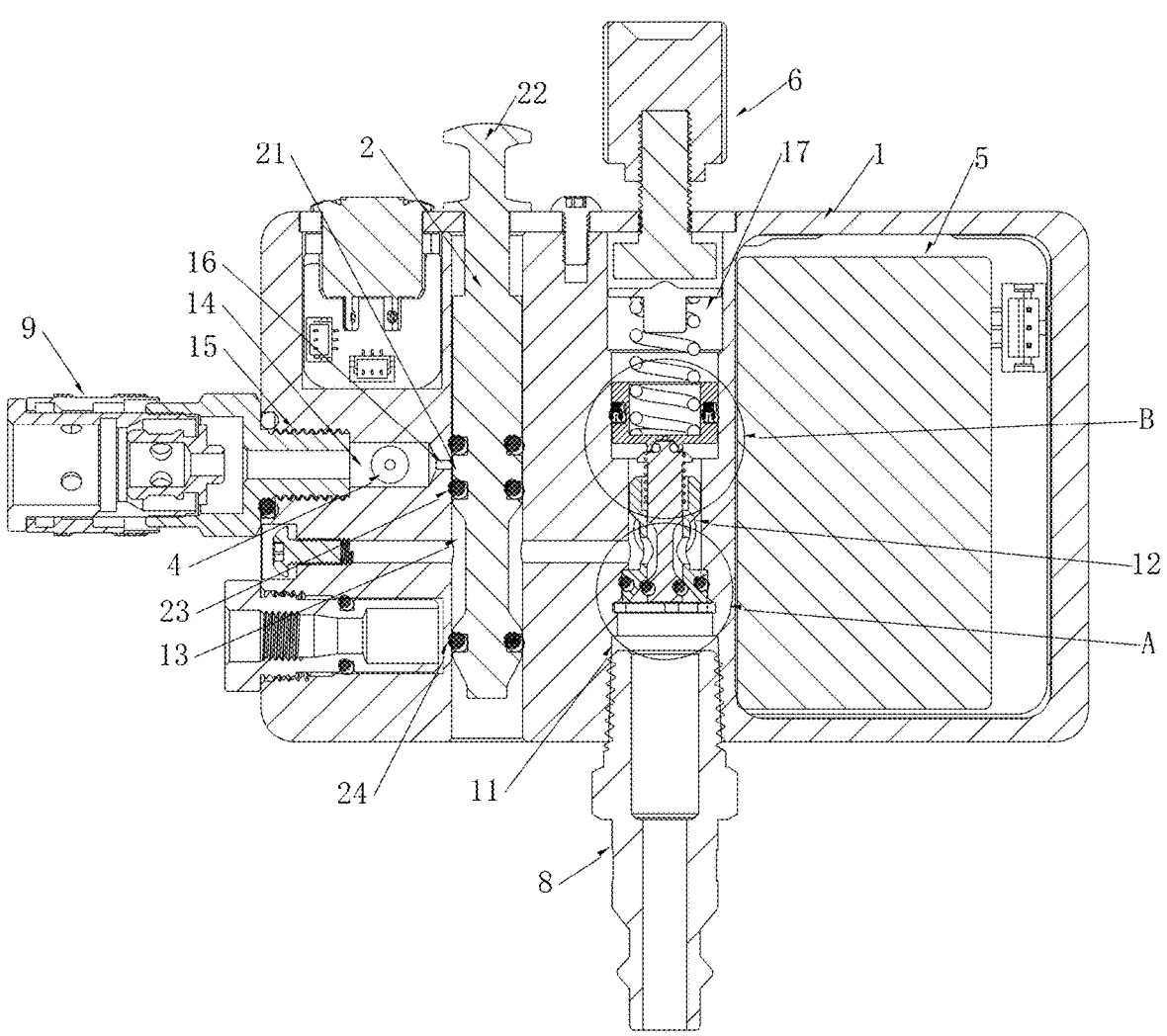
FIG. 3 is a sectional view along line A-A in FIG. 2.

Referring to FIG. 3, in an implementation, the body 1 further has a vent hole 16. The vent hole 16 is located between the connecting channel 13 and the second chamber 14, the vent hole 16 is in communication with the connecting channel 13 and the second chamber 14, and the vent hole 16 has a diameter of d, where 0.9 mm≤d≤1.1 mm. Since the vent hole 16 has a diameter set between 0.9 mm and 1.1 mm, it is ensured that the high-pressure gas in the first chamber 12 can smoothly enter the second chamber 14 through the vent hole 16 during the engine cylinder leakage detection, so that the vent hole 16 with a diameter of 0.9 mm to 1.1 mm can effectively delay the balance between the gas pressure of the first chamber 12 and the gas pressure of the second chamber 14 while the high-pressure gas smoothly enters the interior of the engine cylinder. In this way, a difference between the gas pressure of the first chamber 12 and the gas pressure of the second chamber 14 is close to the actual gas pressure if there is indeed a leakage in the engine cylinder, and accordingly the leakage detection accuracy can be improved while a leakage point of the engine cylinder can be determined easily.

In an implementation, the vent hole 16 has a diameter of d=1 mm. With this diameter, the vent hole 16 can more effectively delay the balance between the gas pressure of the first chamber 12 and the gas pressure of the second chamber 14, contributing to further improving the leakage detection accuracy.

In an implementation, the vent hole 16 has a diameter of d=0.9 mm. With this diameter, the vent hole 16 can effectively delay the balance between the gas pressure of the first chamber 12 the gas pressure of the second chamber 14, contributing to further improving the leakage detection accuracy.

In an implementation, the vent hole 16 has a diameter of d=1.1 mm. With this diameter, the vent hole 16 can effectively delay the balance between the gas pressure of the first chamber 12 the gas pressure of the second chamber 14, contributing to further improving the leakage detection accuracy.

Referring to FIG. 3, in an implementation, the shutoff structure 2 is provided with a first blocking portion 21, and the shutoff structure 2 is moved to drive the first blocking portion 21 to switch between the blocking state and the communicating state.

When the shutoff structure 2 is in the blocking state, the first blocking portion 21 blocks the vent hole 16.

When the shutoff structure 2 is in the communicating state, the first blocking portion 21 is away from the vent hole 16. The movement of the shutoff structure 2 is controlled to drive the first blocking portion 21 to block the vent hole 16 or to be away from the vent hole 16, so that the communication between the first chamber 12 and the second chamber 14 can be implemented. Due to the small diameter of the vent hole 16, the vent hole 16 can be blocked or opened when the first blocking portion 21 is moved with a small stroke, thereby achieving a higher efficiency and easier operation.

Referring to FIG. 3, in an implementation, the shutoff structure 2 is provided with a first operating portion 22. The first operating portion 22 is exposed to the body 1, and the first operating portion 22 is configured to be manually gripped to pull the shutoff structure 2 to move along the connecting channel 13. That is, the shutoff structure 2 is a manual structure. The shutoff structure 2 can be driven to move in the connecting channel 13 by manually gripping the first operating portion 22, making the operation easy and convenient. Moreover, the structure of the integrated leak detection device can be simplified, and the cost of the integrated leak detection device can be further lowered.

In an implementation, this integrated leak detection device further comprises a driving mechanism (not shown) electrically connected to the controller 5. The driving mechanism is disposed on the body 1, connected to the shutoff structure 2, and configured to drive the shutoff structure 2 to move, that is, to electrically drive the shutoff structure 2 to move.

In an implementation, the shutoff structure 2 is further provided with an avoidance portion, the avoidance portion and the connecting channel 13 are in clearance fit and can form a gas flowing channel, and the gas flowing channel is in communication with the vent hole 16 and the first chamber 12 when the first blocking portion 21 is in the communicating state.

Referring to FIG. 3, in an implementation, the shutoff structure 2 is further provided with fifth seal rings 23. There are at least two fifth seal rings 23, and the two fifth seal rings 23 are arranged at the two axial ends of the first blocking portion 21 respectively. When the first blocking portion 21 is in the blocking state, the two fifth seal rings 23 are located on two sides of the vent hole 16 respectively, and the first blocking portion 21 and the body 1 are both pressed against the fifth seal rings 23 to seal a gap between the vent hole 16 and the connecting channel 13, thus preventing gas leakage and further improving the detection accuracy.

Referring to FIG. 3, in an implementation, the shutoff structure 2 is further provided with a sixth seal ring 24. The sixth seal ring 24 is located at an end of the shutoff structure 2 close to the avoidance portion, and the sixth seal ring 24 is further away from the first blocking portion 21 than the avoidance portion. The sixth seal ring 24 is pressed against the shutoff structure 2 and the body 1 to seal a gap between the shutoff structure 2 and the body 1, thus preventing gas leaking from the gas flowing channel, achieving the gas leakage prevention function, and further improving the detection accuracy.

Referring to FIG. 3, in an implementation, the integrated leak detection device for an engine cylinder further comprises: a pressure regulating mechanism 6.

The pressure regulating mechanism 6 is disposed on the body 1, at least a portion of the pressure regulating mechanism 6 is inserted in the first chamber 12 and in communication with the first chamber 12, and the pressure regulating mechanism 6 is configured to regulate the pressure of the first chamber 12. In this way, the pressure regulating mechanism 6 can be utilized to regulate the gas source input pressure in real time, avoiding the gas source input pressure being too small to reduce the detection efficiency, and also avoiding the gas source input pressure being too large to damage the engine cylinder.

Figure 4:
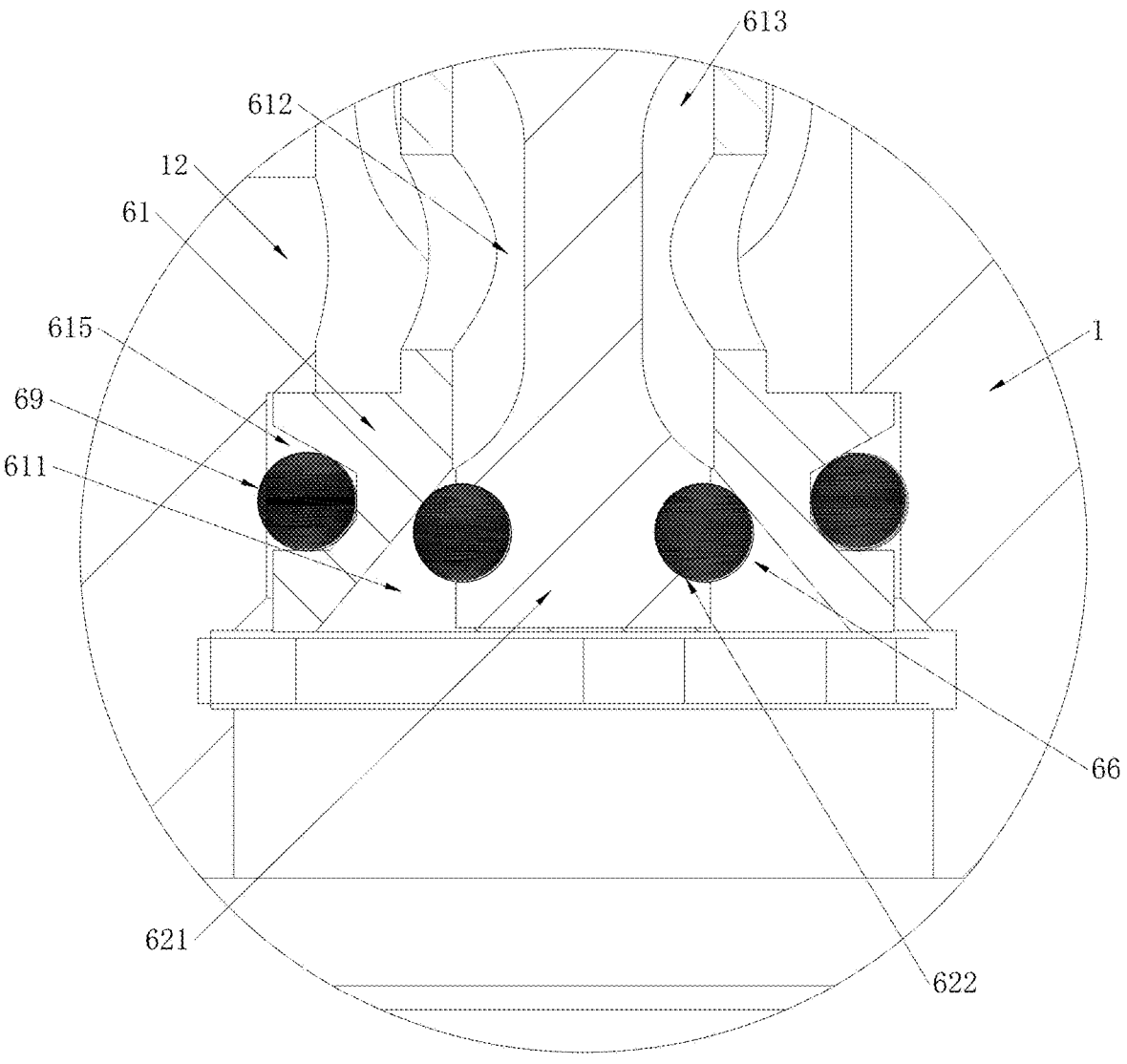
FIG. 4 is a partial enlarged view of part A in FIG. 3.
Figure 5:
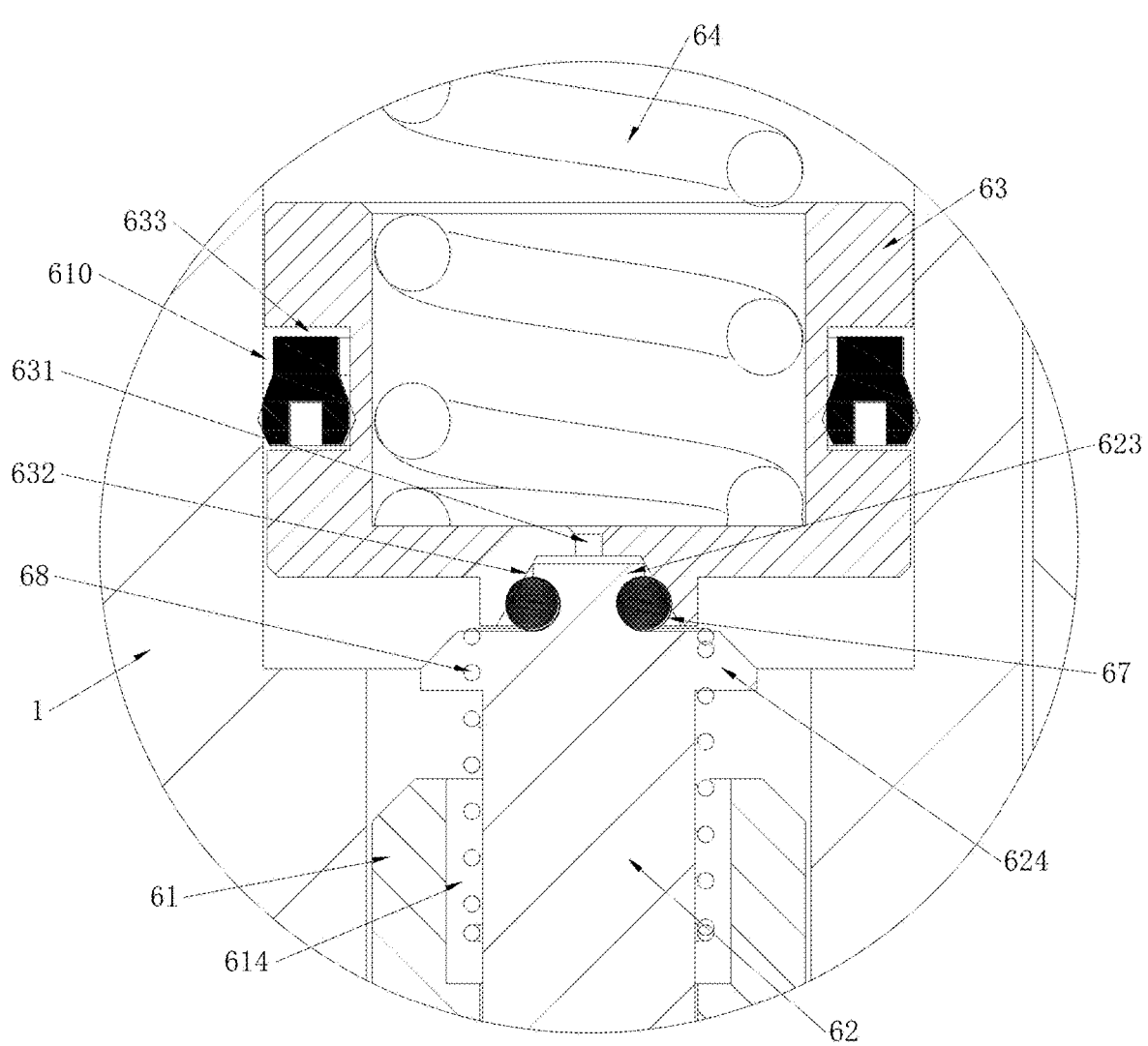
FIG. 5 is a partial enlarged view of part B of FIG. 3.
Figure 6:
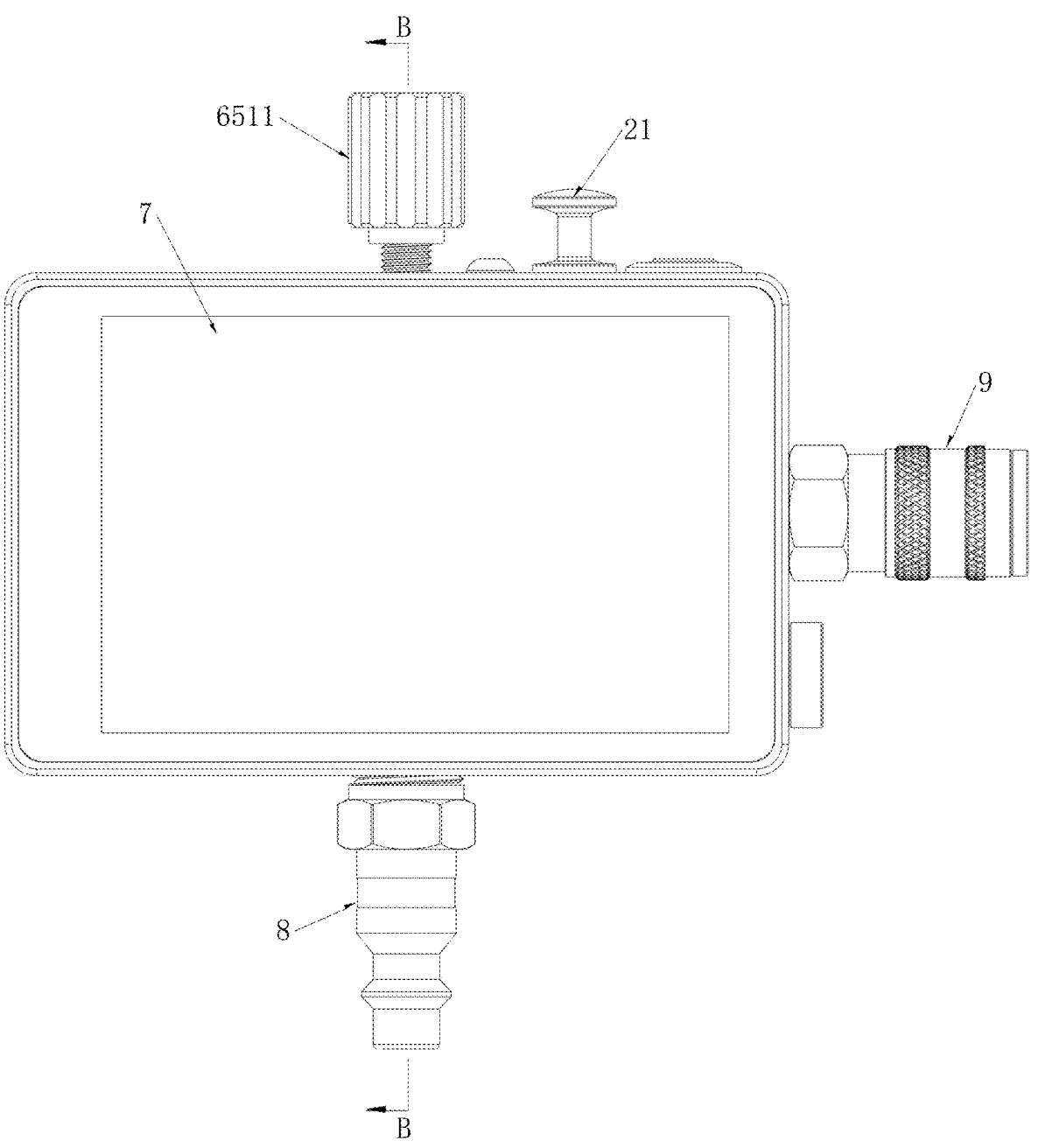
FIG. 6 is a schematic perspective structural diagram of the integrated leak detection device of the present disclosure from a third perspective.

Referring to FIGS. 3-5, in an implementation, the body 1 is further provided with a gas release runner 17. The gas release runner 17 is in communication with the outside world.

The pressure regulating mechanism 6 comprises: a valve seat 61, a gas intake plunger 62, a gas release plunger 63, a first elastic member 64, and an adjusting member 65.

The valve seat 61 is disposed in the first chamber 12, and the valve seat 61 has a gas intake runner 611, a first gas discharge runner 612 and a second gas discharge runner 613. The gas intake runner 611 is in communication with the gas inlet 11 and the first gas discharge runner 612, the first gas discharge runner 612 is in communication with the connecting channel 13 and the first chamber 12, and the second gas discharge runner 613 is in communication with the first gas discharge runner 612 and the gas release runner 17.

The gas intake plunger 62 is movably inserted in the valve seat 61, and the gas intake plunger 62 has a closed state in which the communication between the gas inlet 11 and the first gas discharge runner 612 is shut off and an open state in which the gas inlet 11 is in communication with the first gas discharge runner 612. That is, the gas intake plunger 62 is configured to open and close the gas intake runner 611.

The gas release plunger 63 is movably inserted in the gas release runner 17, the gas release plunger 63 is connected to an end of the gas intake plunger 62 away from the gas inlet 11, and the gas release plunger 63 has a closed state in which the communication between the gas release runner 17 and the second gas discharge runner 613 is shut off and an open state in which the gas release runner 17 is in communication with the second gas discharge runner 613. That is, the gas release plunger 63 is configured to close and open the gas release runner 17.

A first end of the first elastic member 64 is connected to an end of the gas release plunger 63 away from the gas intake plunger 62.

The adjusting member 65 is movably disposed on the body 1, and the adjusting member 65 is connected to a second end of the first elastic member 64.

The adjusting member 65 moves to compress or release the first elastic member 64, and when the first elastic member 64 is compressed, the gas intake plunger 62 is in an open state and the gas release plunger 63 in a closed state.

When the first elastic member 64 is at a first degree of release, the gas intake plunger 62 and the gas release plunger 63 are both in the closed state.

When the first elastic member 64 is at a second degree of release, the gas intake plunger 62 is in the closed state and the gas release plunger 63 is in the open state. In this way, during the engine cylinder leakage detection, the adjusting member 65 is operated forwardly such that the adjusting member 65 compresses the first elastic member 64. While the first elastic member 64 is compressed, the first elastic member 64 drives the gas release plunger 63 and the gas intake plunger 62 to move forwardly such that the gas intake plunger 62 opens the gas intake runner 611, the high-pressure gas source provided by the external gas supply device can enter the first chamber 12 and then enter the second chamber 14 and the interior of the engine cylinder through the first chamber 12. The gas intake flow rate can be adjusted by controlling the opening degree of the gas intake plunger 62, thus realizing regulation of the gas source input pressure. During the leakage detection, after the gas pressures of the first chamber 12 and the second chamber 14 are balanced, the adjusting member 65 is operated reversely such that the adjusting member 65 releases the first elastic member 64, the first elastic member 64 is relaxed to a state at the first degree of release, the gas release plunger 63 and the gas intake plunger 62 are both driven by the first elastic member 64 to move a certain distance reversely, until the gas intake plunger 62 and the gas release plunger 63 are closed to stop delivering the high-pressure gas source to the second chamber 14, while ensuring that there will be no gas leakage, and that the high-pressure gas source in both the second chamber 14 and the engine cylinder can only be leaked out through the leakage point of the engine cylinder. After the detection is completed, by operating the adjusting member 65 reversely again, or under the pushing action of the internal high-pressure gas source, the first elastic member 64 is further relaxed or compressed, such that the first elastic member 64 is in a state at the second degree of release, until the gas intake plunger 62 is closed and the gas release plunger 63 is opened, so as to open the gas release runner 17, thus enabling gas release to realize pressure relief. This pressure regulating mechanism 6 has a simple and practical structure, and is easy to operate and convenient to use.

Referring to FIG. 4, in an implementation, the cross-section of the gas intake runner 611 gradually decreases in a direction in which a gas flows in the gas intake runner.

The gas intake plunger 62 is provided with a second blocking portion 621. The second blocking portion 621 is adapted to the gas intake runner 611, so that it is more convenient to adjust the opening degree of the gas intake plunger 62. Moreover, when closing the gas intake runner 611, the gas intake plunger 62 can be positioned by mating the second blocking portion 621 with the gas intake runner 611, to ensure that the gas intake plunger 62 is reliably closed, while restricting the gas intake plunger 62 from being separated from the valve seat 61.

Referring to FIG. 4, in an implementation, a first ring-shaped positioning groove 622 is provided on an outer peripheral wall of the second blocking portion 621.

The pressure regulating mechanism 6 further comprises: a first seal ring 66.

The first seal ring 66 is disposed in the first ring-shaped positioning groove 622 to restrict an axial movement of the first seal ring 66 along the second blocking portion 621 to improve the sealing reliability.

When the second blocking portion 621 closes the gas intake runner 611, the second blocking portion 621 and the valve seat 61 are both pressed against the first seal ring 66 to seal a gap between the second blocking portion 621 and the valve seat 61 to avoid gas leakage between the second blocking portion 621 and the valve seat 61, so that the leakage detection accuracy can be further improved.

In an implementation, the gas release plunger 63 and the gas intake plunger 62 are connected to each other in a separable manner.

When the gas release plunger 63 in the closed state, the gas release plunger 63 and the gas intake plunger 62 abut against each other to shut off the communication between the second gas discharge runner 613 and the gas release runner 17.

When the gas release plunger 63 is in the open state, the gas release plunger 63 and the gas intake plunger 62 are separated from each other to allow the communication between the second gas discharge runner 613 and the gas release runner 17. In this way, by changing the tightness of the first elastic member 64, the gas release plunger 63 and the gas intake plunger 62 can be driven to abut against each other or to be separated from each other. This structure is simple and practical, is easy to operate and has a high reliability.

Referring to FIG. 5, in an implementation, the gas release plunger 63 has a gas release hole 631. The gas release hole 631 is located between the second gas discharge runner 613 and the gas release runner 17, the gas release hole 631 is in communication with the second gas discharge runner 613 and the gas release runner 17, and the gas release hole 631 has a diameter smaller than the inner diameters of the second gas discharge runner 613 and the gas release runner 17.

When the gas release plunger 63 is in the closed state, the gas intake plunger 62 blocks the gas release hole 631.

When the gas release plunger 63 is in the open state, the gas intake plunger 62 is separated from the gas release hole 631. In this way, the communication between the second gas discharge runner 613 and the gas release runner 17 can be shut off by blocking the gas release hole 631, and the communication between the second gas discharge runner 613 and the gas release runner 17 can be implemented by opening the gas release hole 631, facilitating the operation. Due to the small diameter of the gas release hole 631, the blocking or opening can be realized by means of the gas intake plunger 62, without the need for additional structures, making the structure simple and practical and lowering the cost.

Referring to FIG. 5, in an implementation, the gas release plunger 63 further has a first limiting groove 632. The first limiting groove 632 is in communication with the gas release hole 631.

The gas intake plunger 62 is provided with a first limiting portion 623. The first limiting portion 623 is in inserted in and mates with the first limiting groove 632, and the first limiting portion 623 is provided with a second seal ring 67. The second seal ring 67 is pressed against the first limiting portion 623 and a groove wall of the first limiting groove 632. In this way, when blocking the vent hole 16, the first limiting portion 623 and the first limiting groove 632 mate with each other to position the gas intake plunger 62, ensuring that the gas intake plunger 62 can reliably block the gas release hole 631, making the structure highly reliable. Moreover, a gap between the first limiting portion 623 and the first limiting groove 632 is sealed by the second seal ring 67 to avoid gas leakage, contributing to improving the detection accuracy.

Figure 7:
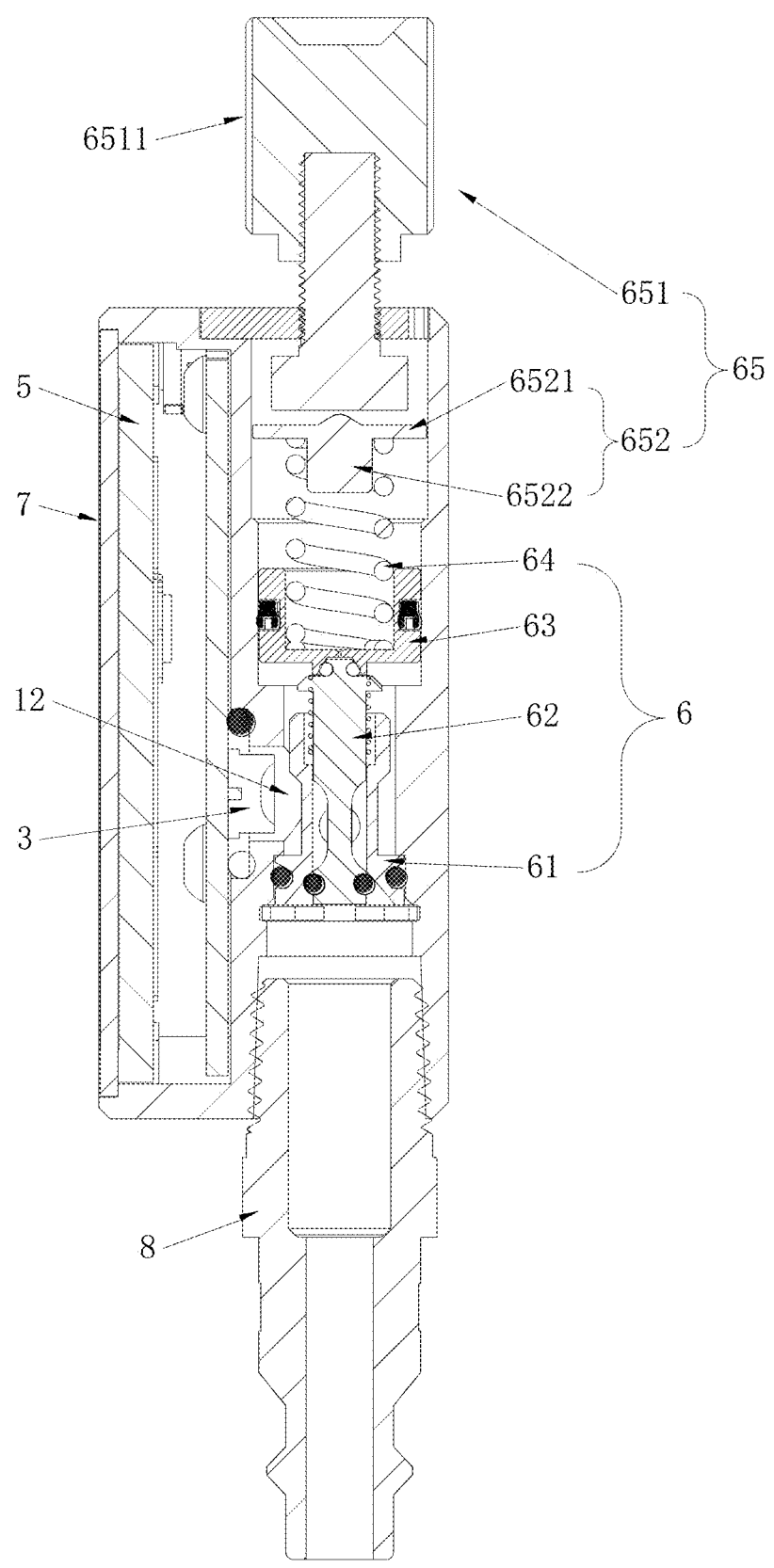
FIG. 7 is a sectional view along line B-B in FIG. 6.

Referring to FIG. 7, in an implementation, the adjusting member 65 comprises: a knob 651.

The knob 651 is screwed to the body 1, and the knob 651 is provided with a second operating portion 6511. The second operating portion 6511 is exposed to the body 1, and the second operating portion 6511 is configured to allow manual rotation of the knob 651. That is, the pressure regulating mechanism 6 is a manual structure, which is easy to operate and low in cost.

In an implementation, the pressure regulating mechanism 6 further comprises a driving mechanism (not shown) electrically connected to the controller 5. The driving mechanism is disposed on the body 1 and connected to the adjusting member 65. The driving mechanism is connected to the pressure regulating member to drive the pressure regulating member to move. That is, the pressure regulating mechanism 6 is an electrically driven structure.

Referring to FIG. 7, in an implementation, the adjusting member 65 further comprises: a floating member 652.

The floating member 652 is movably disposed in the gas release runner 17. The floating member 652 is located between the knob 651 and the first elastic member 64. One end of the floating member 652 is connected to the first elastic member 64, and the other end of the floating member 652 has an abutting state of abutting against the knob 651 and a separated state of being separated from the knob 651. In this way, after the leakage detection is completed, the first elastic member 64 can be compressed under the pushing action of the high-pressure gas source in the engine cylinder, the second chamber 14 and the first chamber 12, causing the first elastic member 64 to be in the state at the second degree of release until the gas intake plunger 62 is closed and the gas release plunger 63 is opened, to allow the communication between the first chamber 12 and the gas release runner 17, thereby enabling gas release to achieve automatic pressure relief. There is no need to manually operate the adjusting member 65, making it more convenient to use.

Referring to FIG. 7, in an implementation, the floating member 652 comprises: a first connecting portion 6521, and a second connecting portion 6522.

The first connecting portion 6521 has the abutting state and the separated state.

The second connecting portion 6522 is connected to the first connecting portion 6521, and the second connecting portion 6522 is inserted in the first elastic member 64. Since the second connecting portion 6522 is inserted in the first elastic member 64, the second connecting portion 6522 and the first elastic member 64 are connected to each other reliably, leading to a high structural reliability, simplifying the installation operation and achieving a high installation efficiency.

In an implementation, the adjusting member 65 and the first elastic member 64 are fixed together. In this way, after the leakage detection is completed, the adjusting member 65 is operated reversely to compress the first elastic member 64, such that the first elastic member 64 is in the state at the second degree of release until the gas intake plunger 62 is closed and the gas release plunger 63 is opened, to allow the communication between the first chamber 12 and the gas release runner 17, thereby enabling gas release to achieve passive pressure relief.

Referring to FIG. 5, in an implementation, the pressure regulating mechanism 6 further comprises: a second elastic member 68.

The second elastic member 68 is fitted over an end of the gas intake plunger 62 away from the gas inlet 11, one end of the second elastic member 68 abuts against the valve seat 61, the other end of the second elastic member 68 abuts against the gas intake plunger 62, and the second elastic member 68 is compressed or released along with the first elastic member 64. In this way, when closing the gas intake plunger 62, the second elastic member 68 can provide a driving force to the gas intake plunger 62, ensuring that the gas intake plunger 62 is closed smoothly, and achieving a higher structural reliability.

Referring to FIG. 5, in an implementation, the valve seat 61 is provided with a second limiting groove 614. The second limiting groove 614 allows an end of the gas intake plunger 62 away from the gas inlet 11 to pass through.

The gas intake plunger 62 is provided with a second limiting portion 624.

One end of the second elastic member 68 is inserted in the second limiting groove 614 and abuts against a bottom wall of the second limiting groove 614, and the other end of the second elastic member 68 abuts against the second limiting portion 624. The configuration of the second limiting groove 614 can accommodate at least a portion of the second elastic member 68, so that the height dimension of the pressure regulating mechanism 6 can be reduced to make the structure of the pressure regulating mechanism 6 more compact, thereby contributing to reducing the overall size of the integrated leak detection device. The configuration of the second limiting groove can also mount and position the second elastic member 68 to ensure that the second elastic member 68 is reliably mounted on the gas intake plunger 62, thus achieving a high structural reliability.

Referring to FIG. 4, in an implementation, a second ring-shaped positioning groove 615 is provided on an outer peripheral wall of an end of the valve seat 61 close to the gas inlet 11.

The pressure regulating mechanism 6 further comprises: a third seal ring 69.

The third seal ring 69 is disposed in the second ring-shaped positioning groove 615 to restrict an axial movement of the third seal ring 69 along the valve seat 61.

The valve seat 61 and the body 1 are both pressed against the third seal ring 69 to seal a gap between the valve seat 61 and the body 1 to prevent the high-pressure gas source in the first chamber 12 from leaking out from between the valve seat 61 and the body 1, so that the leakage detection accuracy can be further improved.

Referring to FIG. 5, in an implementation, a third ring-shaped positioning groove 633 is provided on an outer peripheral wall of the gas release plunger 63.

The pressure regulating mechanism 6 further comprises: a fourth seal ring 610.

The fourth seal ring 610 is disposed in the third ring-shaped positioning groove 633 to restrict an axial movement of the fourth seal ring 610 along the gas release plunger 63.

The gas release plunger 63 and the body 1 are both pressed against the fourth seal ring 610 to seal a gap between the gas release plunger 63 and the body 1. In this way, in the state where the gas release plunger 63 is closed, the fourth seal ring 610 can be utilized to seal the gap between the gas release plunger 63 and the body 1, preventing the high-pressure gas source in the first chamber 12 from leaking out of the gap between the gas release plunger 63 and the body 1, so that the leakage detection accuracy can be further improved.

Referring to FIG. 1, in an implementation, the integrated leak detection device for an engine cylinder further comprises: a display 7.

The display 7 is disposed on the body 1, the display 7 is electrically connected to the controller 5, and the display 7 is configured to display the leakage information, the gas pressure information and the piston top-dead-center position information, so that the leakage information, the gas pressure information and the piston top-dead-center position information are visualized to facilitate the user to determine whether the engine cylinder needs to be inspected.

In an implementation, the controller 5 is further configured to record the leakage information, the gas pressure information and the piston top-dead-center position information.

Referring to FIGS. 1 and 3, in an implementation, the gas inlet 11 is located on one side of the body 1 in a height direction, the first chamber 12 and the connecting channel 13 both extend in the height direction of the body 1, the first chamber 12, the connecting channel 13 and the second chamber 14 are arranged in sequence in a length direction of the body 1, and the gas outlet 15 is located on one side of the body 1 in the length direction.

The display 7 is located on one side of the body 1 in a width direction. In this way, it is possible to improve the utilization rate of the space in the height direction, the space in the length direction, and the space in the width direction of the body 1, making the structure of this integrated leak detection device more compact, the overall size smaller, and more convenient to carry and store.

In an implementation, this integrated leak detection device further comprises: a first quick connector 8, and a second quick connector 9.

The first quick connector 8 is disposed on the body 1 and in communication with the gas inlet 11, and the first quick connector 8 is configured to be connected to the external gas supply device to quickly communicate the gas inlet 11 with the external gas supply device.

The second quick connector 9 is disposed on the body 1 and in communication with the gas outlet 15, and the second quick connector 9 is configured to be connected to the engine cylinder to quickly communicate the gas outlet 15 with the engine cylinder.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present disclosure, the meaning of "a plurality of" is two or more, unless explicitly and specifically defined otherwise.

The above descriptions are merely specific implementations of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. An integrated leak detection device for an engine cylinder, the integrated leak detection device comprising:
   a body, having a gas inlet, a first chamber, a connecting channel, a second chamber, and a gas outlet, the gas inlet being configured to be in communication with a gas supply device, the first chamber being in communication with the gas inlet, the connecting channel being located between the first chamber and the second chamber and in communication with the first chamber and the second chamber, and the gas outlet being configured to be in communication with the engine cylinder;
   a shutoff structure movably disposed on the connecting channel, the shutoff structure having a blocking state in which the communication between the first chamber and the second chamber is shut off and a communicating state in which the first chamber is in communication with the second chamber, and the shutoff structure being moved to switch between the blocking state and the communicating state;
   a first pressure sensor disposed on the body and located in the first chamber, the first pressure sensor being configured to detect a pressure of the first chamber;
   a second pressure sensor disposed on the body and located in the second chamber, the second pressure sensor being configured to detect a pressure of the second chamber, to detect a gas pressure of the engine cylinder, and to detect a piston top-dead-center position of the engine cylinder; and
   a controller disposed on the body and electrically connected to the first pressure sensor and the second pressure sensor, the controller being configured to execute a predetermined program based on feedback information of the first pressure sensor and the second pressure sensor to obtain leakage information, gas pressure information, and piston top-dead-center position information;
   wherein the integrated leak detection device for the engine cylinder further comprises:
   a pressure regulating mechanism disposed on the body, at least a portion of the pressure regulating mechanism being inserted in the first chamber and in communication with the first chamber, and the pressure regulating mechanism being configured to regulate the pressure of the first chamber;
   wherein the body is further provided with a gas release runner which is in communication with the outside world; and the pressure regulating mechanism comprises:

a valve seat disposed in the first chamber, the valve seat having a gas intake runner, a first gas discharge runner and a second gas discharge runner, wherein the gas intake runner is in communication with the gas inlet and the first gas discharge runner, the first gas discharge runner is in communication with the connecting channel and the first chamber, and the second gas discharge runner is in communication with the first gas discharge runner and the gas release runner;

a gas intake plunger movably inserted in the valve seat, the gas intake plunger having a closed state in which the communication between the gas inlet and the first gas discharge runner is shut off and an open state in which the gas inlet is in communication with the first gas discharge runner;

a gas release plunger movably inserted in the gas release runner, the gas release plunger being connected to an end of the gas intake plunger away from the gas inlet, and the gas release plunger having a closed state in which the communication between the gas release runner and the second gas discharge runner is shut off and an open state in which the gas release runner is in communication with the second gas discharge runner;

a first elastic member, a first end of the first elastic member being connected to an end of the gas release plunger away from the gas intake plunger; and an adjusting member movably disposed on the body, the adjusting member being connected to a second end of the first elastic member; wherein the adjusting member moves to compress or release the first elastic member, when the first elastic member is compressed, the gas intake plunger is in the open state and the gas release plunger is in the closed state;

when the first elastic member is at a first degree of release, the gas intake plunger and the gas release plunger are both in the closed state; and when the first elastic member is at a second degree of release, the gas intake plunger is in the closed state and the gas release plunger is in the open state.

2. The integrated leak detection device for the engine cylinder according to claim 1, wherein the body further has a vent hole located between the connecting channel and the second chamber, the vent hole being in communication with the connecting channel and the second chamber, and having a diameter of d, where 0.9 mm≤d≤1.1 mm.

3. The integrated leak detection device for the engine cylinder according to claim 2, wherein the shutoff structure is provided with a first blocking portion;

when the shutoff structure is in the blocking state, the first blocking portion blocks the vent hole; and when the shutoff structure is in the communicating state, the first blocking portion is away from the vent hole.

4. The integrated leak detection device for the engine cylinder according to claim 1, wherein the shutoff structure is provided with a first operating portion exposed to the body, the first operating portion being configured to be manually gripped to pull the shutoff structure to move along the connecting channel.

5. The integrated leak detection device for the engine cylinder according to claim 1, wherein the cross-section of the gas intake runner gradually decreases in a direction in which a gas flows in the gas intake runner; and the gas intake plunger is provided with a second blocking portion adapted to the gas intake runner.

6. The integrated leak detection device for the engine cylinder according to claim 5, wherein a first ring-shaped positioning groove is provided on an outer peripheral wall of the second blocking portion;

the pressure regulating mechanism further comprises:

a first seal ring disposed in the first ring-shaped positioning groove to restrict an axial movement of the first seal ring along the second blocking portion; and when the second blocking portion closes the gas intake runner, the second blocking portion and the valve seat are both pressed against the first seal ring to seal a gap between the second blocking portion and the valve seat.

7. The integrated leak detection device for the engine cylinder according to claim 1, wherein the gas release plunger and the gas intake plunger are connected to each other in a separable manner;

when the gas release plunger is in the closed state, the gas release plunger and the gas intake plunger abut against each other to shut off the communication between the second gas discharge runner and the gas release runner; and when the gas release plunger is in the open state, the gas release plunger and the gas intake plunger are separated from each other to allow the communication between the second gas discharge runner and the gas release runner.

8. The integrated leak detection device for the engine cylinder according to claim 7, wherein the gas release plunger has a gas release hole located between the second gas discharge runner and the gas release runner, the gas release hole being in communication with the second gas discharge runner and the gas release runner, and having a diameter smaller than inner diameters of the second gas discharge runner and the gas release runner;

when the gas release plunger is in the closed state, the gas intake plunger blocks the gas release hole; and when the gas release plunger is in the open state, the gas intake plunger is separated from the gas release hole.

9. The integrated leak detection device for the engine cylinder according to claim 8, wherein the gas release plunger further has a first limiting groove which is in communication with the gas release hole;

the gas intake plunger is provided with a first limiting portion, the first limiting portion being inserted in and mating with the first limiting groove, and the first limiting portion being provided with a second seal ring pressed against the first limiting portion and a groove wall of the first limiting groove.

10. The integrated leak detection device for the engine cylinder according to claim 1, wherein the adjusting member comprises:

a knob screwed to the body, the knob being provided with a second operating portion exposed to the body and configured to allow manual rotation of the knob.

11. The integrated leak detection device for the engine cylinder according to claim 10, wherein the adjusting member further comprises:

a floating member movably disposed in the gas release runner and located between the knob and the first elastic member, one end of the floating member being connected to the first elastic member, and the other end of the floating member having an abutting state of abutting against the knob and a separated state of being separated from the knob.

12. The integrated leak detection device for the engine cylinder according to claim 11, wherein the floating member comprises:

a first connecting portion having the abutting state and the separated state; and a second connecting portion connected to the first connecting portion and inserted in the first elastic member.

13. The integrated leak detection device for the engine cylinder according to claim 1, wherein the pressure regulating mechanism further comprises:

a second elastic member fitted over an end of the gas intake plunger away from the gas inlet, one end of the second elastic member abutting against the valve seat, the other end of the second elastic member abutting against the gas intake plunger, and the second elastic member being compressed or released along with the first elastic member.

14. The integrated leak detection device for the engine cylinder according to claim 13, wherein the valve seat is provided with a second limiting groove for allowing an end of the gas intake plunger away from the gas inlet to pass through;

the gas intake plunger is provided with a second limiting portion; and one end of the second elastic member is inserted in the second limiting groove and abuts against a bottom wall of the second limiting groove, and the other end of the second elastic member abuts against the second limiting portion.

15. The integrated leak detection device for the engine cylinder according to claim 1, wherein a second ring-shaped positioning groove is provided on an outer peripheral wall of an end of the valve seat close to the gas inlet;

the pressure regulating mechanism further comprises:

a third seal ring disposed in the second ring-shaped positioning groove to restrict an axial movement of the third seal ring along the valve seat; and the valve seat and the body are both pressed against the third seal ring to seal a gap between the valve seat and the body.

16. The integrated leak detection device for the engine cylinder according to claim 1, wherein a third ring-shaped positioning groove is provided on an outer peripheral wall of the gas release plunger;

the pressure regulating mechanism further comprises:

a fourth seal ring disposed in the third ring-shaped positioning groove to restrict an axial movement of the fourth seal ring along the gas release plunger; and the gas release plunger and the body are both pressed against the fourth seal ring to seal a gap between the gas release plunger and the body.

17. The integrated leak detection device for the engine cylinder according to claim 1, wherein the integrated leak detection device for an engine cylinder further comprises:

a display disposed on the body, the display being electrically connected to the controller and configured to display the leakage information, the gas pressure information and the piston top-dead-center position information.

18. The integrated leak detection device for the engine cylinder according to claim 17, wherein the gas inlet is located on one side of the body in a height direction, the first chamber and the connecting channel both extend in the height direction of the body, the first chamber, the connecting channel and the second chamber are arranged in sequence in a length direction of the body, and the gas outlet is located on one side of the body in the length direction; and the display is located on one side of the body in a width direction.

* * * * *